US011803461B2

United States Patent
Kannan et al.

(10) Patent No.: US 11,803,461 B2
(45) Date of Patent: Oct. 31, 2023

(54) VALIDATION OF LOG FILES USING BLOCKCHAIN SYSTEM

(71) Applicant: Hewlett Packard Enterprise Development LP, Houston, TX (US)

(72) Inventors: Rajkumar Kannan, Bangalore (IN); Aruna Srinivasa Murthy, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 419 days.

(21) Appl. No.: 16/948,129

(22) Filed: Sep. 3, 2020

(65) Prior Publication Data

US 2021/0133079 A1 May 6, 2021

(30) Foreign Application Priority Data

Oct. 30, 2019 (IN) .............................. 201941043883

(51) Int. Cl.
| | |
|---|---|
| *G06F 11/34* | (2006.01) |
| *H04L 9/32* | (2006.01) |
| *G06F 11/10* | (2006.01) |
| *G06F 9/50* | (2006.01) |
| *H04L 9/00* | (2022.01) |

(52) U.S. Cl.
CPC ........ *G06F 11/3476* (2013.01); *G06F 9/5027* (2013.01); *G06F 11/1004* (2013.01); *H04L 9/3236* (2013.01); *H04L 9/3247* (2013.01); *H04L 9/50* (2022.05)

(58) Field of Classification Search
CPC ............ G06F 11/3476; G06F 11/1004; G06F 9/5027; H04L 9/3236; H04L 9/3247; H04L 9/50
See application file for complete search history.

(56) References Cited

U.S. PATENT DOCUMENTS

| | | |
|---|---|---|
| 10,033,702 B2 | 7/2018 | Ford et al. |
| 10,986,097 B2 * | 4/2021 | Sloane .................. H04L 9/3239 |
| 2014/0317157 A1 | 10/2014 | Sparkes et al. |
| 2017/0126702 A1 | 5/2017 | Krishnamurthy |
| 2017/0177898 A1 | 6/2017 | Dillenberger |

(Continued)

FOREIGN PATENT DOCUMENTS

WO   2016/148738 A1   9/2016

OTHER PUBLICATIONS

Corda, "An Open Source Blockchain Platform for Businesses", available online at <https://web.archive.org/web/20190723020648/https://www.corda.net/>, Jul. 23, 2019, 7 pages.

(Continued)

*Primary Examiner* — Azizul Choudhury
(74) *Attorney, Agent, or Firm* — Trop, Pruner & Hu, P.C.

(57) ABSTRACT

Examples include a blockchain system for managing and validating log files generated corresponding to transactions of a plurality of computing resources. Some examples include creating a block, in the blockchain system, corresponding to a log file generated corresponding to a transaction of a computing resource of the plurality of computing resources. Some examples include performing checksum validation of log files generated corresponding to transactions of a plurality of computing resources, using a blockchain system.

20 Claims, 4 Drawing Sheets

(56) References Cited

U.S. PATENT DOCUMENTS

| | | | |
|---|---|---|---|
| 2017/0220426 A1 | 8/2017 | Sankar et al. | |
| 2017/0228371 A1 | 8/2017 | Seger, II | |
| 2017/0236123 A1 | 8/2017 | Ali et al. | |
| 2017/0352116 A1 | 12/2017 | Pierce et al. | |
| 2018/0060836 A1 | 3/2018 | Castagna | |
| 2018/0137131 A1 | 5/2018 | Karuppusamy et al. | |
| 2018/0189301 A1 | 7/2018 | Kannan et al. | |
| 2018/0260212 A1* | 9/2018 | Wisnovsky | G06F 16/113 |
| 2019/0012666 A1 | 1/2019 | Krauss et al. | |
| 2019/0013934 A1 | 1/2019 | Mercuri et al. | |
| 2019/0079950 A1* | 3/2019 | Ramabaja | H04L 9/3239 |
| 2019/0251295 A1* | 8/2019 | Vieyra | H04L 9/30 |
| 2019/0303621 A1 | 10/2019 | Baset et al. | |
| 2019/0324958 A1 | 10/2019 | Ow et al. | |
| 2019/0354725 A1 | 11/2019 | Lowagie | |
| 2019/0372756 A1 | 12/2019 | Kim et al. | |
| 2020/0057860 A1* | 2/2020 | Patil | G06F 21/6209 |
| 2020/0097961 A1* | 3/2020 | Luo | H04L 9/0637 |
| 2020/0104294 A1 | 4/2020 | Alas et al. | |

OTHER PUBLICATIONS

Ethereum Foundation, "Ethereum Project", available online at <https://web.archive.org/web/20170928113351/http://ethereum.org/>, Sep. 28, 2017, 11 pages.

Hearn et al., "Corda: A distributed ledger", Version 1.0, Technical-Whitepaper—Aug. 20, 2019, pp. 1-73.

Linux Foundation, "About—Hyperledger", available online at <https://web.archive.org/web/20191016165912/https://www.hyperledger.org/about>, Oct. 16, 2019, 7 pages.

Edicom, "Blockchain and Electronic Data Archiving: Evidence Protection", available online at <https://www.edicomgroup.com/en_US/news/11506-blockchain-and-electronic-data-archiving-evidence-protection.html>, May 7, 2018, 4 pages.

Kang et al., "Blockchain for Secure and Efficient Data Sharing in Vehicular Edge Computing and Networks", IEEE, 2012, pp. 1-12.

Sutton et al., "Blockchain Enabled Privacy Audit Logs", Research Gate, Oct. 2017, 17 pages.

Wikipedia, "Blockchain", available online at <https://en.wikipedia.org/w/index.php?title=Blockchain&oldid=893385950>, Apr. 21, 2019, 17 pages.

Corda Documentation, "Corda OS 4.5: Writing a Contract", available online at <https://docs.corda.net/docs/corda-os/4.5/tutorial-contract.html>, retrieved on Oct. 8, 2020, 13 pages.

Github, "ethereumbook: What Is a Smart Contract?", available online at <https://github.com/ethereumbook/ethereumbook/blob/develop/07smart-contracts-solidity.asciidoc#what-is-a-smart-contract>, Jul. 11, 2020, 35 pages.

Hewlett Packard Enterprise Development LP, "HPE 3PAR File Persona User Guide: HPE 3PAR OS 3.3.1", Edition 1, P30182-001, Jul. 2020, pp. 1-276.

Hewlett Packard Enterprise Development LP, "HPE 3PAR StoreServ Management Console 3.4 User Guide", Ed. 1, No. QL226-99896a, Sep. 2018, pp. 1-208.

Hewlett Packard Enterprise Development LP, "Technical Overview of HPE 3PAR File Persona Software: Truly converged file and object access for HPE 3PAR StoreServ Storage", Technical white paper, Rev. 8, Apr. 2020, pp. 1-25.

Hyperledger, "Hyperledger Architecture, vol. II: Smart Contracts", Apr. 2018, pp. 1-14.

Micobo GmbH, "Technical difference between Ethereum, Hyperledger fabric and R3 Corda", available online at <https://medium.com/@micobo/technical-difference-between-ethereum-hyperledger-fabric-and-r3-corda-5a58d0a6e347>, Medium, Mar. 16, 2018, 13 pages.

R3, "Smart Legal Contracts on Enterprise Blockchains: A Corda Example", available online at <https://www.r3.com/blog/smart-legal-contracts-on-enterprise-blockchains-an-r3-corda-example/>, Aug. 21, 2019, 3 pages.

\* cited by examiner

VALIDATION OF LOG FILES USING BLOCKCHAIN SYSTEM

BACKGROUND

Information regarding the operations and events of a computer system may be recorded using log files. Computer systems may have several hundreds of log files from multiple components and subcomponents such as firmware, drivers, enclosures, storage management software, etc.

BRIEF DESCRIPTION OF THE DRAWINGS

The following detailed description references the drawings, wherein.

DETAILED DESCRIPTION

Figure 1:
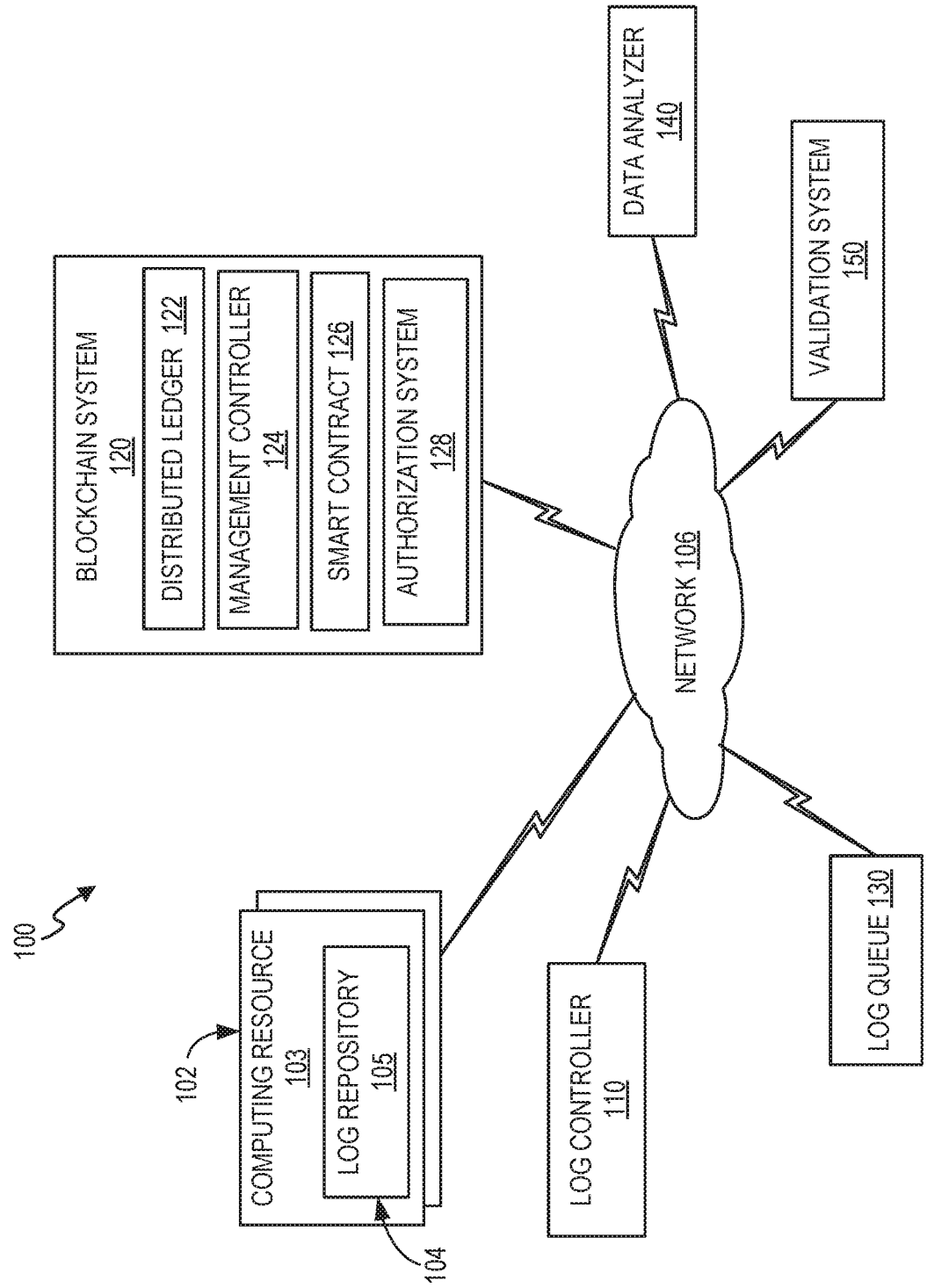
FIG. 1 is a block diagram of an example computing environment including a plurality of computing resources, a blockchain system, a validation system and a data analyzer.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two as or more than two. The term "another," as used herein, is defined as at least a second or more. The term "associated," as used herein, is defined as connected or coupled, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. The term "based on" means based at least in part on. It will also be understood that, although the terms first, second, third, etc. may be used herein to describe various elements, these elements should not be limited by these terms, as these terms are only used to distinguish one element from another unless stated otherwise or the context indicates otherwise.

Storage systems may utilize large amounts of data, which may be transferred among different clusters of the storage systems such as edge, core and cloud. Data from the edge may be generated by resources (i.e., edge resources, edge devices or gateway resources) such as data collecting resources (e.g., sensors). In an example, an edge resource may include a smart device that reports data to local compute resources where real-time reaction or control occurs. Data from the core may be generated by resources (i.e., core resources) deployed on a dedicated premise infrastructure, for example an on-premise datacenter in an enterprise. Data from the cloud may be generated by resources (i.e., cloud resources) deployed on a remote infrastructure, for example a cloud datacenter. Logs files (collectively referred to herein as "log data") may be generated corresponding to transactions of (e.g., events performed by) several edge, core and cloud resources or applications that collectively generate, collect, and process the data while transferring the data among different clusters. These log files may record information regarding the transactions and provide information regarding operational characteristics of the resources or applications. For example, a computer system may process vast amounts of data for a variety of applications. To determine processing of an application by the computer system, a log file may be designed that records various functional outputs within the application. Hence, log files from storage systems may be used for analytics to observe general operational characteristics of the resources or applications, for example, usage access patterns, amount of data generated, rogue data, and entrusted resources, and overall condition of the systems. Such analytics may help in detecting malicious patterns or faults in the systems and avoiding internal theft and loss of data.

Though data, including log files, may be protected through the use of safe channels and encryption, challenges related to the credibility of a system remain, as do traceability issues. Furthermore a variety of different issues may be encountered while processing, managing, and analyzing log files. For example, in a system with several resources and applications, the level of security may vary and lead to reliability issues. As a result, some of the log files may be at risk of being tampered with, modified, or made inconsistent by application(s). The complexity may be even more when the log files are collected from geographically distributed sites. Inclusion of such log files (that have been modified or tampered with) for the analytics may be problematic and may provide inaccurate details of operational characteristics of the resources or applications.

Examples described herein provide integrated systems and techniques that may allow for maintaining a distributed ledger (e.g., including creating blocks in a distributed ledger) using a blockchain system for managing log files or performing checksum validation on log files (e.g., to validate the consistency of log files) using the blockchain system. Use of the blockchain system, in such systems, may provide a highly secure system for managing log files and performing checksum validation on log files to identify log files that have been tampered with or that are inconsistent. In examples described herein, an integrated system involving a blockchain system may perform checksum validation on many log files (e.g., billions of log files) using their block identities as well as various attributes of log files (e.g., metadata) and unique identifiers of computing resources.

For example, the blockchain system may act as an index that can help in the process of performing checksum validation on log files. Thus, the integrated systems may allow simple and time saving processes for performing checksum validation on log files to identify log files that are inconsistent or that have been tampered with, which may be removed from further processing (i.e., analytics).

A "blockchain" may include a public or private digital ledger for maintaining records of a sequence of executed transactions in blocks, which are linked cryptographically. In such examples, a "block" of a blockchain may be a unit of data recordation for the blockchain. In such examples, a given block of a blockchain may contain information to record (e.g., identify or indicate) a given transaction, and a block signature (for example, a hash or cryptographic hash) of a prior block to link the given block and the prior block. This way, blocks may be chained together in the blockchain by including in a given block the signature of a prior block of the blockchain. Such chaining of blocks may enable confirmation of the integrity of block in a blockchain and make it difficult to alter a block in the blockchain without such alteration being readily detectable. In some examples, a blockchain may be implemented by a blockchain system, which may comprise a plurality of computing devices to implement the blockchain system. In such examples, the blockchain system may implement a blockchain as a distributed ledger, which is a form of a decentralized database that may be stored at one or more entities participating in the blockchain system (e.g., blockchain nodes, such as respective computing devices). In such examples, each entity participating in a blockchain system may get a copy of the blockchain (i.e. the distributed ledger), which may be downloaded automatically upon enrolling (e.g., registering as per a registration model to access the blockchain system) for the blockchain system. At least some blockchain nodes may maintain the blockchain and cryptographically validate each new block added to the blockchain, and the transaction(s) represented in the corresponding block. The blockchain system may record information identifying the blockchain nodes and information identifying an owner of each block. An owner of a block may be a blockchain node that provides data to create that block in the distributed ledger.

The term "block signature", as used herein, refers to an identifier for a block in a distributed ledger. In an example, the block signature of a block in a distributed ledger may be a signature generated based on a content of the block in any suitable manner (e.g., via a digital signature function, hash function, or the like) to produce a representation of the block signature in any suitable form (e.g., a numeric string, alphanumeric string, of the like). In some examples, a block signature for a block may be a cryptographic hash generated at the creation of the block in the distributed ledger.

In a blockchain system, a series of blocks may be generated in a distributed ledger to record information related to executed events. In examples described herein, a given block may include information of a given log file corresponding to an event performed by a computing resource. For example, a block for the given log file may comprise information identifying an owner of the block (e.g., a given computing resource that generates and stores a log file in the log repository), information identifying a signature of data content of the given log file or a signature of metadata of the given log file, or a timestamp of creation of the block. In addition, new blocks corresponding to additional events in relation to the given computing resource may be created over time that include additional information (e.g., to represent respective events performed by the computing resource). In such examples, to record an event performed by the given computing resource, a new block for the given computing resource may be added to the distributed ledger. Further, each new block for a given computing resource may include a block signature of a prior block for the given computing resource. In examples described herein, for a given block for a given computing resource in a distributed ledger, a "prior block" may refer to a block in the distributed ledger for the same given computing resource and that is the last-created block for the given computing resource that was created before the creation of the given block (i.e., such that the distributed ledger contains no intervening block between the prior block and the given block for the given computing resource). In this manner, the blocks corresponding to the events performed by a computing resource may be "chained" together to form a series of blocks in a distributed ledger. In such examples, each additional block may create additional security for the validity of the entire distributed ledger. This makes it difficult to retroactively add data or alter data stored within the distributed ledger without that addition or alteration being detected. The series of block in the distributed ledger may include each created block, including the first block for a given computing resource to a latest block (also referred to as a most recent block) for the given computing resource. Accordingly, in such examples, use of a blockchain system may enable to record events performed by the computing resources with high security, and an ability to detect changes to the records (e.g., in the case of corruption, breach, etc.).

As used herein, the terms such as "data" or "record" may be used to refer to any information related to a log file stored in a log repository or a distributed ledger. In an example, data and record, individually, may include one or more log files or information related to the log files.

Further, as noted, a blockchain system may be implemented as a public or a private distributed ledger. In a private distributed ledger, the access to the distributed ledger may be restricted for securing its privacy. For example, in such implementations, various nodes including participating entities of the blockchain system may be assigned with certain protocols and permissions to access the distributed ledger. In such examples, some nodes may have only read permissions while other nodes may have read and write permissions. In these implementations, each node may need to enroll with the blockchain system according to a registration model to use or access the distributed ledger. The registration model may involve a subscription fee depending on the purpose of an enterprise. In some examples, the enrollment may be a part of an overall blockchain system for a user. In some examples, a third party agency may get enrolled through the registration model. Some nodes, for example participating entities may access data pertaining only to them via public-private key encryption. In this example, data on the private distributed ledger may be relevant to a given participating entity that may be encrypted using a blockchain public key such that only a blockchain private key can decrypt its contents.

Some examples described herein may relate to a method for maintaining a distributed ledger, using a blockchain system, for managing log files in a computing environment. In an example, the method may include receiving, by a blockchain system, information related to a log file generated corresponding to a transaction of a computing resource, and creating a block in the blockchain system, corresponding to the log file. The block may include information related to the log file and a block signature of a prior block. Further, in examples described herein, the created block may comprise one or more of information identifying the computing resource, a signature of metadata of the log file or a signature of data content of the log file. In an example, the information identifying the computing resource may include a unique identifier of the computing resource e.g., Global Unique Identifier (GUID). In some examples, the block (i.e., the created block), in the blockchain system, may include information identifying a signature of metadata of the log file, information identifying a signature of data content of the log file and information identifying the computing resource. In some examples, the created block may further include additional information such as a timestamp of the transaction.

In some examples, various blocks may be created in the distributed ledger of the blockchain system corresponding to respective log files generated corresponding to respective transactions of a plurality of computing resources. Inclusion of various information related to the log files in the corresponding blocks of the distributed ledger may enable performance of checksum validation on the log files, through the blockchain system. In such instances, the checksum validation on the log files may be performed to validate the consistency of the log files over a period of time, validate the integrity of the computing resource, or both. In some examples, the present subject matter provides methods and systems for performing checksum validation on a log file, through the blockchain system, to validate the consistency of the log file, validate the integrity of the computing resource, or both. Performing such checksum validation on log files may enable identification of one or more log files that may be inconsistent or that may have been tampered with, which may be removed for further processing (e.g., analyzing the log files to observe general operational characteristics of the computing resources).

In an aspect, examples relate to a validation system that includes at least one non-transitory machine readable medium containing a set of instructions executable by at least one processing resource. The set of instructions may provide instructions of performing checksum validation on a log file. The set of instructions, when executed, may cause the at least one processing resource to access a block, in a distributed ledger of a blockchain system, that corresponds to a log file generated corresponding to a transaction of a computing resource, retrieve first information from the block, retrieve second information from the log file, and determine whether first information matches second information. In an example, the first information includes a signature of metadata of the log file, a signature of data content of the log file, or information identifying the computing resource. In an example, the second information includes a signature of metadata of the log file, a signature of data content of the log file, or information identifying the computing resource. In an example, in response to determining that the first information matches the second information, the checksum validation may be successful. In another example, in response to determining that the first information does not match the second information, the checksum validation may be failed.

The systems and methods of the present subject matter are further described with reference to FIGS. 1-8. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Although the one or more portions of the description herein are with reference to one log file, the methods and described techniques may be utilized for several log files. Furthermore, many process and functions performed by the blockchain system, as described herein, may be performed by one or more components of the blockchain system. Various implementations of the present subject matter have been described below by referring to several examples.

FIG. 1 is a block diagram of an example computing environment 100 including a plurality of computing resources 102, a blockchain system 120 maintained to manage log files generated corresponding to transactions of the plurality of computing resources 102 and a validation system 150. The computing environment 100 may be used in an enterprise comprising servers, storage networks, communication networks, etc. In an example, a plurality of log repositories 104 of each computing resource of the plurality of computing resources 102, a log controller 110, and a log queue 130 may be present in the computing environment 100. In an example, various components of the computing environment 100 may be communicatively coupled to one another via a network 106 such as wired or wireless network. In examples described herein, the network 106 may include, for example, a local area network (LAN), a virtual LAN (ULAN), a wireless local area network (WLAN), a virtual private network (VPN), the Internet, or the like.

Any functionality described herein as performed by a component of the computing environment 100, for example, computing resources 102, the log controller 110, blockchain system 120, the log queue 130, the data analyzer 140, or the validation system 150 may be performed by at least one processing resource executing instructions to perform the functionality described herein (e.g., as part of one or more computing device(s)).

As used herein, the term "computing resource" may refer to one or more software or hardware modules of at least one computing device or system, or any resource, component, or subsystem of that at least one computing device or system. In an example, each computing resource 102 of the plurality of computing resources may include one or more resources such as processing resources (e.g., central processing units, graphics processing units, microcontrollers, application-specific integrated circuits, programmable gate arrays, and/or other processing resources), storage resources (e.g., random access memory, non-volatile memory, solid state drives, hard disk drives HDDs, optical storage devices, tape drives, and/or other suitable storage resources), network resources (e.g., Ethernet, IEEE 802.11 Wi-Fi, and/or other suitable wired or wireless network resources), I/O resources, and/or other suitable resources. Each computing resource 102 may have metadata associated with it, which may be in the form of labels or annotations specifying different attributes (e.g., configuration attributes) related to the computing resource. Each computing resource 102 may be connected to other computing resources in the computing environment 100 through the network 106 and is capable transferring data to other computing resources in the computing environment 100. In an example, a computing resource 102 may be deployed on a dedicated premise infrastructure, for example, an on-premise datacenter. In another example, a computing resource 102 may be deployed on a remote infrastructure, for example cloud datacenter. In some examples, a computing resource 102 may be deployed on a hybrid datacenter. Other examples of a computing resource 102 may include, but are not limited to, edge resources such as data collecting resources e.g., sensors, edge line servers, home servers, mobile resources and the like.

In an example of the present subject matter, a log file may be generated corresponding to a transaction of a computing resource of the plurality of computing resources 102. In such example, the log file may be stored in a respective log repository 104 of the computing resource or a log repository of another computing resource coupled to the computing resource. Such another computing resource may include a data collecting resource that may be deployed in the computing environment 100. In an example, a sensor may be coupled to an edge server and generate a log file in a log repository of the edge server. In some examples, each computing resource 102 may have several hundreds of log files, in respective log repository 104, corresponding to several transactions of the respective computing resource 102 or another computing resource coupled to the computing resource. Each log file may include a timestamp of the corresponding transaction, information identifying the corresponding transaction, metadata of the log file, a signature of metadata of the log file, metadata of the data content of the log file, a signature of metadata of the log file, information identifying the computing resource that performed the transaction, or combinations thereof. In an example, information identifying a computing resource may include a unique identifier e.g., GUID of the corresponding computing resource. The timestamp of the transaction may indicate the time at which the transaction occurred or was carried out. The information identifying the transaction may indicate the computing process in relation to which the transaction occurred or was carried out.

As used herein, the term "signature of metadata of a log file" may refer to an identifier for the metadata of the log file. In an example, the signature of metadata of a log file may be a hash created for the metadata of the log file while generating the log file. The term "signature of data content of a log file" may refer to an identifier for the data content of the log file. In an example, the signature of data content of a log file may be a hash created for the data content of the log file while generating the log file.

As used herein, the term "transaction" may refer to an event or an operation performed by a computing resource. In an example, a transaction performed by a computing resource may be according to a verified transaction (that may be allowed to be performed by a computing resource) as per the smart contract 126. In some examples, a transaction of a computing resource such as a data collecting resource may be real-time data collection. In some examples, a transaction of a computing resource may include an event or an operation performed on a file stored in a computing resource, for example, a storage system, In such examples, a transaction may include one or more operations including a file operation (e.g., a natural file operation), an operation to change a status of the file, an operation to change a location of the file, or an operation for a retention-state transition of the file or the like. For the purposes of this disclosure, the word "natural," as it may pertain to natural file operations may refer to operations that may be performed in relation to a file in the natural operation of a computing device and/or a file system. For example, users or applications may access (e.g., via a file system) a file or metadata to carry out the purpose of the user or the application, Examples of natural operations include a file read, a file write, a command to read the metadata of a file (e.g., getattr( )), a command to write the metadata of a file (e.g., setattr( )) or the like. An operation to change a status may include deletion or creation of the file. An operation to change a location of the file may include moving the file from one location to another location for space management in the storage system. An operation for a retention-state transition may include a transition of a file from one retention state to another retention state. As used herein, the term "retention-state" may refer to a retention protection received for a file under a retention policy for a period of time, as per compliance standards. As used herein, the term "compliance standards" may refer to standards given by regulatory authorities and/or enterprises as per internal policies, and federal and state laws. A file may be stored/hold and designated under a plurality of retention-states depending on a kind of retention protection received for a file.

In the computing environment 100 as illustrated in FIG. 1, the data analyzer 140 may be implemented for performing analytics of logs files generated corresponding to transactions of the computing resources 102 to determine general operational characteristics of the resources or applications (as described previously) in the computing environment 100. In this regard, the computing environment 100 may include a log queue 130 that may receive log files from a log controller 110 and send the log files to the data analyzer 140. The log controller 110 may receive the log files from the plurality of computing resources 102. In an example, the log controller 110 may receive the log files from the plurality of log repositories 104 of the plurality of computing resources 102. The log controller 110 may classify the log files in accordance with the respective computing resources 102, and send the log files to the log queue 130 for subsequently sending them to the data analyzer 140. Accordingly, during analyzing log files for operational characteristic determination of the computing resources, log files classified against a computing resource may be analyzed together. In some examples, the log controller 110 may send many log files, received from the plurality of computing resources 102, to the log queue 130 in a sequence according to the timestamp of the corresponding transactions. The log queue 130 may hold the log files in the sequence before sending them to the data analyzer 140. In some examples, the log files may be sent, from the log queue 130 to the data analyzer 140 in same sequence. Any functionality described herein as performed by the log controller 110 or the log queue 130 may be performed by at least one processing resource executing instructions to perform the functionality described herein.

In some examples, the log controller 110 may further send information related to each log file to the blockchain system 120 after classifying the log files. In an example, the log controller 110 may be a participating entity of the blockchain system 120 and may have access to the blockchain system 120 to send information related to each log file received from the plurality of log repositories 104 of the plurality of computing resources 102. In an example, the information related to each log file may include one or more of information identifying the corresponding computing resource, a signature of metadata of the log file or a signature of data content of the log file. In an example, the information related to each log file may further include a timestamp of the corresponding transaction, information identifying the corresponding transaction or combinations thereof.

In an example illustrated in FIG. 1, the blockchain system 120 includes a distributed ledger 122 that includes a series of blocks and a management controller 124 that perform several functions to create a block and retrieve information from a block of the distributed ledger 122. In such examples, the management controller 124 may perform these functions according to various blockchain protocols and specifications. In an example, the blockchain system 120 may further include a smart contract 126 that is a deterministic module executed within a sandbox, ensuring that a transaction in relation to a computing resource is according to a verified transaction as per the smart contract 126 and a computing resource performing a transaction is authorized computing resource. As used herein, the term "authorized computing resource" may refer to a computing resource that is a participating entity to the blockchain system 120 and allowed to perform a transaction according to the smart contract 126.

In examples as described herein, the computing resources 102 of the plurality of computing resources may maintain the distributed ledger 122 implemented by the blockchain system 120 in the computing environment 100. In an example, the distributed ledger 122 may be maintained according to various functionalities of the blockchain system 120. Each computing resource 102 may be a participating entity of the blockchain system 120 and provide information related to each log file to the blockchain system 120 to create respective blocks in the distributed ledger 122. In an example, information related to each log file may be sent to the blockchain system 120 by the log controller 110 that receives the information from the computing resources 102. As each computing resource 102 may be a participating entity of the blockchain system 120, each computing resource 102 may maintain a copy of the distributed ledger 122 according to certain protocols and permissions of the blockchain system 120.

In examples as described herein, the distributed ledger 122 may be implemented as a private distributed ledger. The distributed ledger may be accessed by a node in the computing environment 100), in accordance with certain protocols and permissions of the blockchain system 120 to access the distributed ledger 122. In some examples, a user or a client or a third party agency may access the distributed ledger 122 via such a node in accordance with certain protocols and permissions of the blockchain system 120. A node may have a role based access to the blockchain system 120 according to the registration model (described previously) or the rules that define the blockchain protocols and specifications. For example, a participating entity such as a computing resource or the log controller 110 may have read and write access while a user or a third party agency (that is not a participating entity of the blockchain system 120) that performs checksum validation on one or more log files may have read only access. In some examples, a computing resource such as a data collector resource may be a participating entity to the blockchain system 120, but may not have permission to access to the distributed ledger.

In some examples, the blockchain system 120 may include an authorization system 128 to permit or restrict a node to access the distributed ledger 122. For example, the authorization system 128 may permit a node e.g., a computing resource 102 to access the distributed ledger 122 and may restrict another node e.g., a data collector resource (that does not have permission to access) to access the distributed ledger 122.

Functionalities described herein as performed by blockchain system 120 (e.g., performed by any of distributed ledger 122, management controller 124, smart contract 126, and authorization system 128) may be performed by at least one processing resource of at least one computing device executing instructions to perform those functionalities described herein.

The management controller 124 may be a computing device that may be any suitable type of computing device as described herein. For the sake of simplicity, the functions performed by at least one processing resource in the management controller 124 may be considered to be performed by the blockchain system 120, as described throughout the specification. In other words, most of the functionalities described herein as performed by blockchain system 120 may be performed by instructions stored on at least one machine readable storage medium of the management controller 124, executed by the at least one processing resource of the management controller 124. The at least one machine readable storage medium may be non-transitory and alternatively referred to as a non-transitory machine readable medium. The at least one machine readable storage medium may be implemented by volatile memory (e.g., one or more volatile memory devices, such as DRAM device(s), DIMM(s), or the like).

Figure 2:
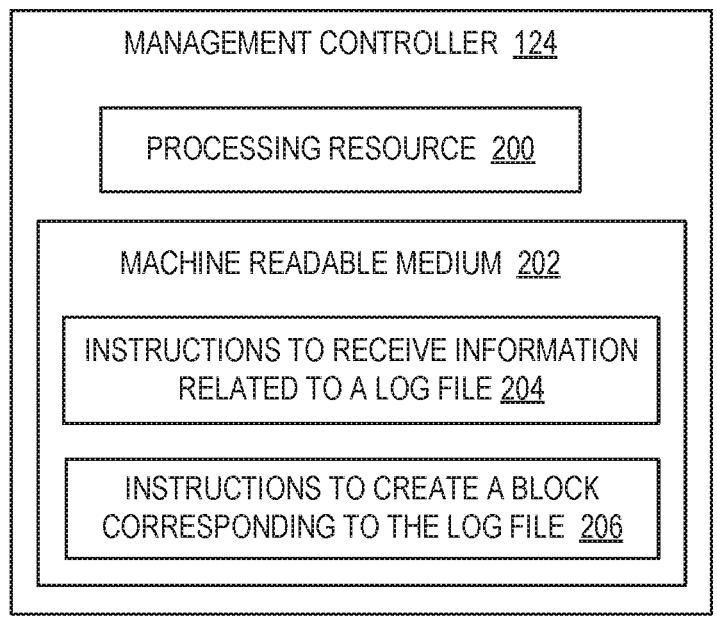
FIG. 2 is a block diagram of an example management controller of a blockchain system to create a block, corresponding to a log file, that is generated corresponding to a transaction of a computing resource.

FIG. 2 is a block diagram of an example of the management controller 124 of FIG. 1. As illustrated in FIG. 2, the management controller 124 may include a processing resource 200 and a machine readable storage medium 202 comprising (e.g., encoded with) at least instructions 204 and 206 that are executable by the processing resource 200 of the management controller 124 to implement functionalities described herein in relation to instructions 204 and 206. The at least instructions 204 and 206 of FIG. 2, when executed by the processing resource 200, may implement various aspects of maintaining the distributed ledger 122 by a plurality of computing resources 102 (via the log controller 110) using the blockchain system 120.

In the examples described herein, most of the functionalities described herein in relation to instructions 204 and 206 executed by the processing resource 200 of the management controller 124 may be described as performed by the blockchain system 120.

Figure 3:
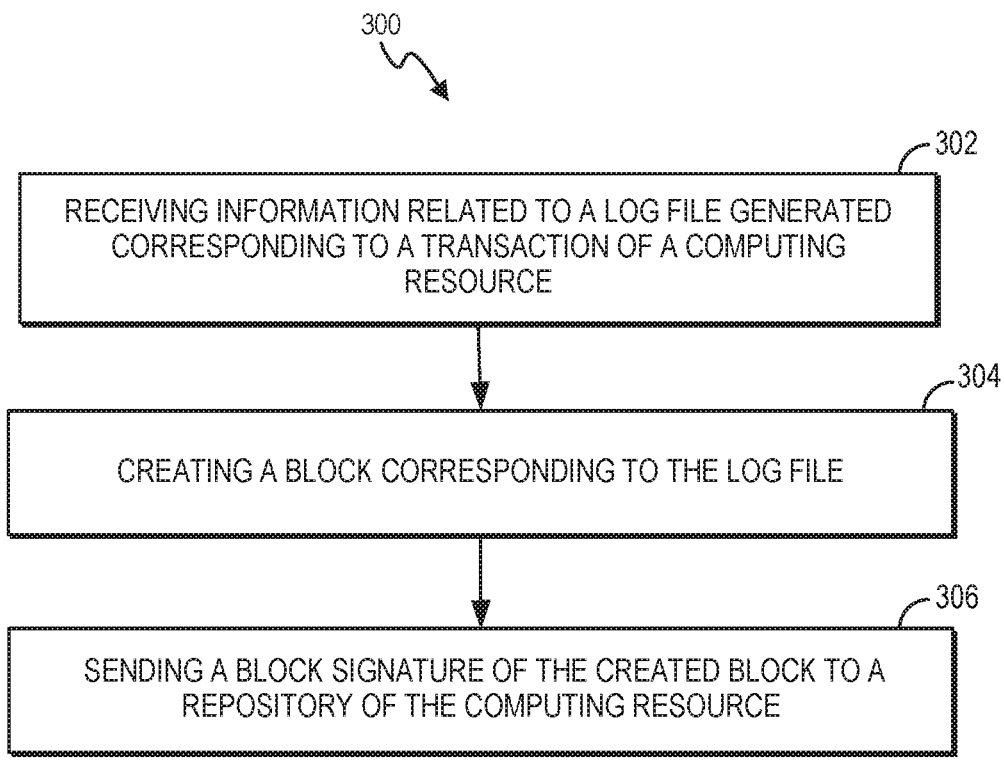
FIG. 3 is a flowchart of an example method that includes creating, in a blockchain system, a block corresponding to a log file generated corresponding to a transaction of a computing resource.

The instructions 204, when executed, may cause the processing resource 200 to receive information related to a log file generated corresponding to a transaction of a computing resource 103 of the plurality of computing resources 102. In some examples, the instructions 206, when executed, may cause the processing resource 200 to creating a block corresponding to the log file, that includes information identifying the log file and a block signature of a prior block. The block may further include one or more of information identifying the computing resource, a signature of metadata of the log file or a signature of data content of the log file. The instructions 204-206 may include various instructions to execute at least a part of the methods described in FIG. 3 (described later). Also, although not shown in FIG. 2, the machine readable medium 202 may also include additional program instructions to perform various other method blocks described in FIG. 3. Although the flowchart of FIG. 3 shows specific orders of performance of certain functionalities, method 300 is not limited to that order. For example, the functionalities shown in succession in the flowcharts may be performed in a different order, may be executed concurrently or with partial concurrence, or a combination thereof. Although the below method description is described with reference to the management controller 124 of FIG. 2, however other computing devices suitable for the execution of method 300, may be utilized.

FIG. 3 is a flow chart depicting an example method 300 for maintaining the distributed ledger 122 by the plurality of computing resources 102 using the blockchain system 120. For ease of illustration, the method 300 will be described with reference to FIG. 1. Although the method 300 may be described with reference to one log file, the method 300 and described techniques may be utilized for several log files. Additionally, implementation of method 300 is not limited to such examples.

At method block 302, the method 300 may include receiving information related to a log file generated corresponding to a transaction of a computing resource 103 of the plurality of computing resources 102. In an example, the log file may be generated corresponding to the transaction of the computing resource 103 and stored in a corresponding log repository 105 of the plurality of log repositories 104. In such instances, the log controller 110 may receive the log file from the corresponding log repository 105. The log controller 110 may classify the log file in accordance with the computing resource 103. In some examples, at method block 302, the method 300 may include receiving, by the blockchain system 120, the information related to the log file from the log controller 110. In an example, the information related to the log file may include one or more of information identifying the computing resource 103, a signature of metadata of the log file or a signature of data content of the log file. In an example, the information related to the log file may further include a timestamp of the corresponding transaction, information identifying the corresponding transaction or combinations thereof. In some examples, the information identifying the corresponding transaction may include information identifying an operation (described previously) performed by the corresponding computing resource 103.

At method block 304, the method 300 may include creating a block corresponding to the log file, that comprises information identifying the log file and a block signature of a prior block. In an example, the block may be created by the management system 124 in the distributed ledger 122 of the blockchain system 120. In an example, the block (i.e., the created block) may include one or more of information identifying the computing resource 103, a signature of metadata of the log file or a signature of data content of the log file. In an example, a block signature of the block may be created on the creation of the block in the distributed ledger 122.

In some examples, at method block 304, the method 300 may include validating the log file generated corresponding to the transaction of the corresponding computing resource 103 before creating the block. This validation may be performed by the participating entities i.e., the plurality of computing resources. In an example, the participating entities may approve (e.g., by providing consensuses) a log file generated corresponding to the transaction of the corresponding computing resource by determining whether the computing resource may be authorized computing resource (that may be allowed to perform the transaction) as per the smart contract 126 or the transaction may be an event or an operation (that may be allowed to be performed by the computing resource) as per the smart contract 126.

In some examples, at method block 306, the method 300 may include sending the block signature of the created block to a repository (not shown in Figures) of the computing resource. In an example, the repository may store the block signatures of the respective blocks created, in the distributed ledger 122, that corresponds to log files generated corresponding to respective transactions of a computing resource of the plurality of computing resources 102.

Figure 4:
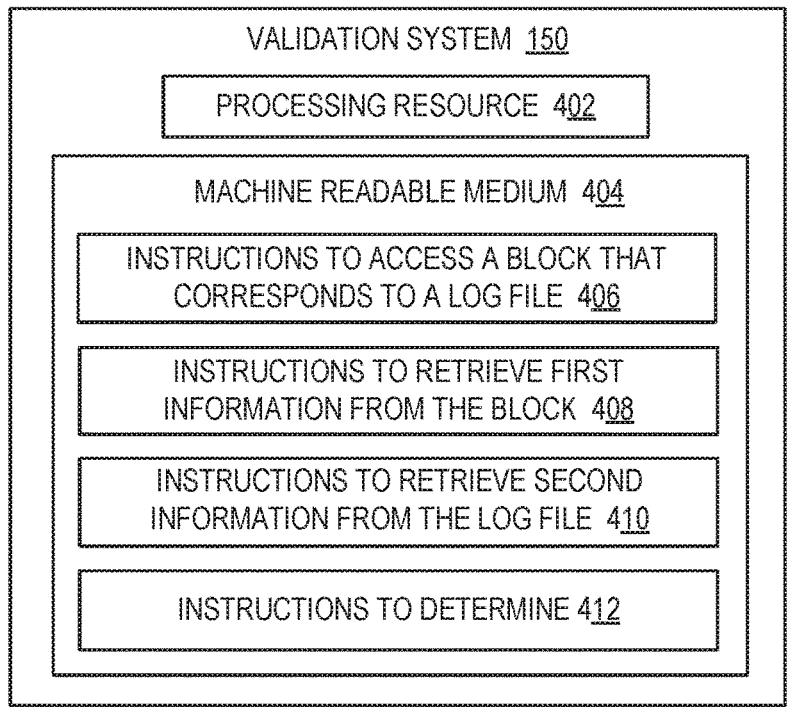
FIG. 4 is a block diagram of an example validation system to perform checksum validation on a log file through a blockchain system.

FIG. 4 is a block diagram of an example validation system 150 that comprises a processing resource 402 and a machine readable storage medium 404 comprising (e.g., encoded with) at least instructions 406, 408, 410 and 412 that are executable by the processing resource 402 of the validation system 150 to implement functionalities described herein in relation to instructions 406, 408, 410 and 412. The validation system 150 may be a computing system as described herein. The machine readable storage medium 404 may be non-transitory and alternatively referred to as a non-transitory machine readable medium. The machine readable storage medium 404 may be implemented by volatile memory (e.g., one or more volatile memory devices, such as DRAM device(s), DIMM(s), or the like).

Figure 5:
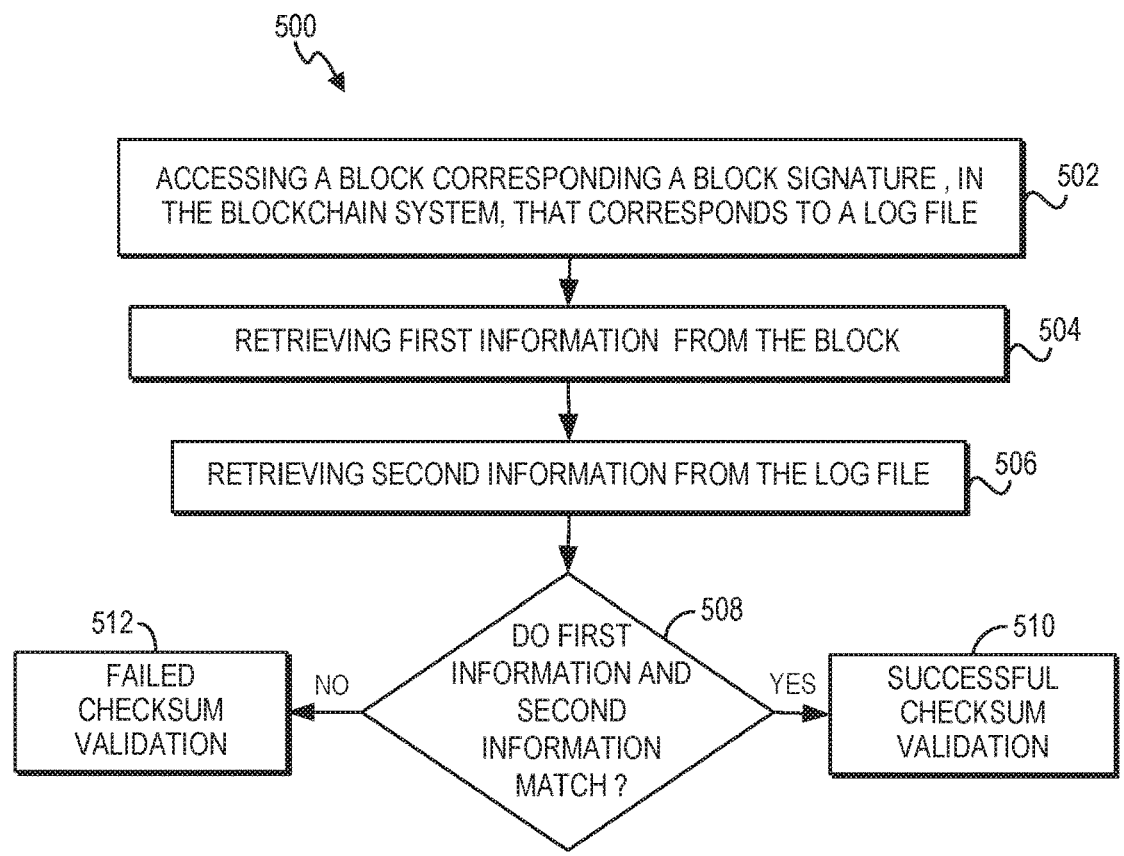
FIG. 5 is a flowchart of an example method for performing checksum validation on a log file through a blockchain system.

FIG. 5 is a flowchart of an example method 500 for performing checksum validation on a log file using the blockchain system 120. In an example, the method 500 of checksum validation the log file may be performed to validate the integrity and consistency of the log file. The execution of method 500, is described in details below with reference to FIGS. 4 and 5. Although the below description is described with reference to the validation system 150 of FIG. 4, however other computing devices suitable for the execution of method 500 may be utilized. Additionally, implementation of method 500 is not limited to such examples. Although the flowchart of FIG. 5 shows a specific order of performance of certain functionalities, method 500 is not limited to that order. For example, the functionalities shown in succession in the flowchart may be performed in a different order, may be executed concurrently or with partial concurrence, or a combination thereof. The instructions 406-412 may include various instructions to execute at least a part of the methods described in FIG. 5. Also, although not shown in FIG. 4, the machine readable medium 404 may also include additional program instructions to perform various other method blocks described with reference to FIG. 5.

At method block 502 of the method 500, instructions 406 of the validation system 150 of FIG. 4, may (e.g., when executed by the processing resource 402) cause the processing resource 402 to access a block of the distributed ledger 122, in the blockchain system 120, that corresponds to a log file. In an instance, the log file may be available in the log queue 130. The block corresponding to the log file may be accessed by retrieving the block corresponding to a block signature of the block. In an example, the block signature of the block may be retrieved from a repository of the corresponding computing resource by a user, a client, a third party agency or the computing resource itself. In an example, the block signature of the block may be received by the validation system 150. In another example, the block signature of the block may be received by the management system 124. In such instances, the validation system 150 may receive the block signature of the block from the management system 124 of the blockchain system 120. After receiving the block signature of the block, the validation system 150 may retrieve the block, in the distributed ledger 122, corresponding to the block signature.

At 504 of the method 500, instructions 408 may cause the processing resource to retrieve first information including a signature of metadata of the log file, a signature of data content of the log file or information identifying the corresponding computing resource. In an example, the first information may include the signature of metadata of the log file, the signature of data content of the file and information identifying the corresponding computing resource, retrieved from blockchain system 120. At 506 of the method 500, instructions 410 may cause the processing resource to retrieve second information including a signature of metadata of the log file, a signature of data content of the log file or information identifying the corresponding computing resource, from the log file that may be available in the log queue 130. In an example, second information may comprise the signature of metadata of the log file, the signature of data content of the log file and information identifying the corresponding computing resource retrieved from the log file itself. In some examples, the instructions 410 may retrieve second information from the log file itself by accessing the log file in the log queue 130 and computing the log file to retrieve second information.

At 508 of the method 500, instructions 412 may determine whether first information matches second information. In an example, at method block 508 of the method 500, the instructions 412 may further generate a report that includes comparison of first information and second information to present whether first information matches second information. In an example, in response to determining that first information matches second information ('YES' at method block 508), the method 500, at method block 510 may include providing information that checksum validation is successful. In an example, the method 500, at method block 510, may include generating a report that may show successful checksum validation. In another example, in response to determining that first information does not match second information ('NO' at the method block 508), the method 500, at the method block 512, may include providing information that checksum validation has failed. In an example, the method 500, at the method block 512, may include generating a report that may show failed checksum validation. Failed checksum validation may indicate that the log file may not be a valid log file. In such examples, the log file may be removed from the log queue 130 so that the log file may not be sent to the data analyzer 140 for analytics. In some examples, the method 500 of checksum validation may be performed on multiple log files in the log queue 130, using the blockchain system 120, to determine whether the log files, individually, may be a valid log files.

Valid log file, as used herein, may mean a log file that is consistent over a period of time and that may be generated corresponding to a transaction of authorized computing resource. Authorized computing resource may refer to a computing resource that may be allowed to perform a transaction in accordance with the smart contract 126 of the blockchain system 120. In an example, the authorized computing resource may be a participating entity of the blockchain system 120. In an example, a log file generated corresponding to a transaction of a computing resource that is not authorized computing resource, the log file may not be deemed a valid log file. In another example, a log file that may not be consistent (e.g., tampered or modified) over a period of time, may not be deemed a valid log file. In some examples, a log file that is consistent over a period of time and that may be generated corresponding to a transaction of authorized computing resource, may be deemed a valid log file.

Figure 6:
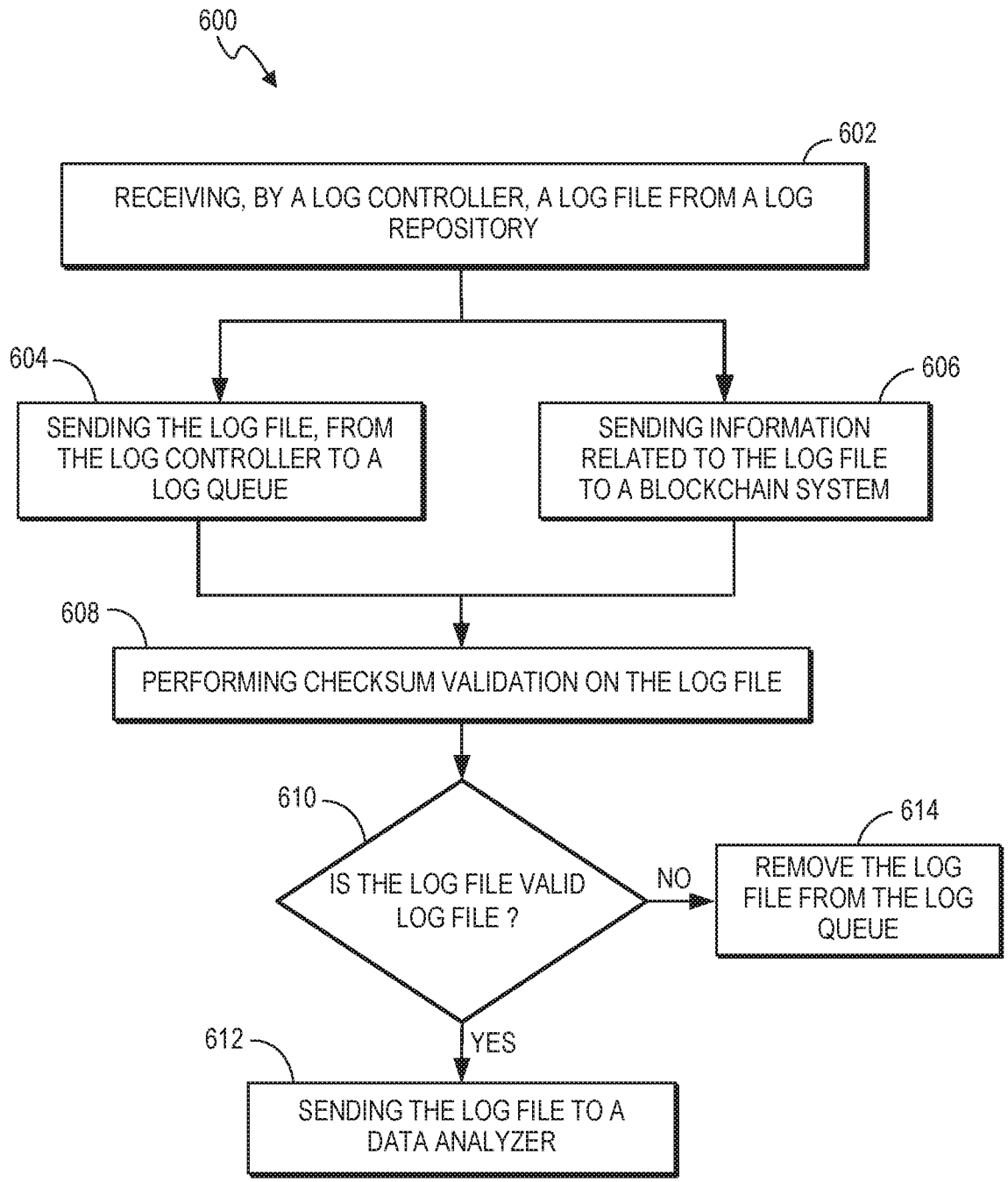
FIG. 6 is a flowchart of an example method that includes sending a log file to a data analyzer after determining that the log file is a valid log file.

Turning now to FIG. 6, a flow diagram is depicting a method 600, in accordance with some examples. FIG. 6 will be described in conjunction with FIG. 1, and for describing overall functioning of the components of the computing environment 100. In an example, at method block 602, the method 600 may include receiving, by the log controller 110, a log file from a log repository 105 of a computing resource 103. As discussed previously, the log controller 110 classify the log file in accordance with a respective computing resource 103 of the plurality of computing resources 102. In one example, at method block 604, the method 600 may include sending the log file to the log queue 130. In one example, at method block 606, the method 600 may include sending information related to the log file to the blockchain system 120. In some examples, the method block 604 for sending the log file to the log queue 130 and the method block 606 for sending the information related to the log file to the blockchain system 120 may be performed simultaneously or sequentially. At method block 608, the method 600 may include performing checksum validation on the log file, in the log queue 130, through the blockchain system 120, to determine whether the log file is a valid log file at method block 610. The process of determining whether the log file is a valid log file, is described in reference to FIGS. 4 and 5.

In some examples, at method block 608, performing checksum validation on the log file may include determining whether the log file is consistent (i.e., validating the consistency of the log file over a period of time). In some examples, performing checksum validation on the log file may include determining whether the computing resource is authorized computing resource (i.e., validating the integrity of the computing resource). That is, in some examples, performing checksum validation on a log file may include validating the consistency of the log file, validating the integrity of the corresponding computing resource or a combination thereof. In some examples where a computing resource may not be deemed authorized, the computing resource may be tagged (for example, red-flagged) for invalidating any further log files generated corresponding to transactions of the computing resource. In some such examples, the computing resource may be evicted from accessing the blockchain system 120.

Referring to FIG. 6, in some examples, in response of determining that the log file is a valid log file ('YES' at the method block 610), the method 600, at the method block 612, may include sending the log file from the log queue 130 to the data analyzer 140 for further processing i.e., analytics. The data analyzer 140 may analyze the log file that may be helpful in determining operational characteristics of the corresponding computing resource and condition of the computing environment 100. In some examples, in response of determining that the log file is not a valid log file ('NO' at the method block 610), the method 600, at the method block 614 may include removing the log file from the log queue 130.

As described in examples herein, performing checksum validation on a log file may determine whether the log file is a valid log file or not. A valid log file may be processed for further analytics while a log file that is not a valid log file (i.e., non-valid log files) may be removed from the log queue and may not be involved for the analytics. That is, performing checksum validation may be helpful in determining whether a log file may be sent for the analytic or removed. Removal of a non-valid log file (e.g., tampered or inconsistent log file) from analytics may provide accurate and beneficial details of operational characteristics of the resources or applications, which may be helpful in detecting and avoiding internal thefts and loss of data.

In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage system, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1, 2, and 4, log controller 110, blockchain system 120, management controller 124, authorization system 128, log queue 130, data analyzer 140 and validation system 150 may each be implemented by one machine-readable storage medium, or multiple machine-readable storage media.

The invention claimed is:

1. A method comprising:
accessing, in a distributed ledger of a blockchain system, a block that corresponds to a log file generated for a transaction of a computing resource;
retrieving, from the block by a computing system, first information comprising information identifying the computing resource and at least one of a signature of metadata of the log file or a signature of data content of the log file;
retrieving, from the log file in a log queue by the computing system, second information comprising information identifying the computing resource and at least one of a signature of metadata of the log file in the log queue or a signature of data content of the log file in the log queue;
determining, by the computing system, whether the first information matches the second information;
validating, by the computing system, the log file in the log queue responsive to determining that the first information matches the second information; and
based on the validating of the log file in the log queue, sending, by the computing system, the log file as part of a collection of log files from the log queue over a network to an analyzer to perform analytics by the analyzer on the collection of log files sent from the log queue, the collection of log files sent from the log queue to the analyzer excluding a log file determined by the computing system to be invalid, wherein the analytics on the collection of log files from the log queue comprise a determination of operational characteristics of computing resources, and the analyzer is separated by the network from the blockchain system and the computing system.

2. The method of claim 1, wherein the transaction of the computing resource comprises a file operation, an operation to change a status of a file, an operation to change a location of the file, or an operation corresponding to a retention-state transition of the file.

3. The method of claim 1, wherein the transaction of the computing resource comprises real-time data collection.

4. The method of claim 1, further comprising validating the transaction before creating the block in the distributed ledger.

5. The method of claim 1, wherein the determination of the operational characteristics of the computing resources comprises detecting a malicious pattern or a fault in a system.

6. The method of claim 1, further comprising:
retrieving, by the computing system from a further block of the distributed ledger, third information comprising information identifying a further computing resource and at least one of a signature of metadata of a further log file or a signature of data content of the further log file;
retrieving, from the further log file in the log queue by the computing system, fourth information comprising information identifying the further computing resource and at least one of a signature of metadata of the further log file in the log queue or a signature of data content of the further log file in the log queue;
determining, by the computing system, whether the third information matches the fourth information; and
removing, by the computing system, the further log file from the log queue responsive to the third information not matching the fourth information, to prevent sending the further log file from the log queue to the analyzer.

7. The method of claim 1, further comprising storing, by the computing resource in a repository, a block signature of the block corresponding to the log file.

8. The method of claim 1, further comprising:
validating an integrity of the computing resource responsive to determining that the first information matches the second information.

9. The method of claim 1, wherein the validating of the log file comprises determining that the log file is consistent over time.

10. The method of claim 1, wherein the information identifying the computing resource in the block comprises a unique identifier of the computing resource.

11. An article comprising at least one non-transitory machine readable medium containing instructions executable by a computing system to:
access, in a distributed ledger of a blockchain system, a block that corresponds to a log file generated for a transaction of a computing resource;
retrieve, from the block, first information comprising a signature of metadata of the log file, a signature of data content of the log file, and information identifying the computing resource;
retrieve, from the log file in a log queue, second information comprising a signature of metadata of the log file in the log queue, a signature of data content of the log file in the log queue, and information identifying the computing resource;
determine, at the computing system, whether the first information matches the second information;
validate, at the computing system, the log file in the log queue responsive to determining that the first information matches the second information; and
based on the validating of the log file in the log queue, send, from the computing system, the log file as part of a collection of log files from the log queue over a network to an analyzer to perform analytics by the analyzer on the collection of log files sent from the log queue, the collection of log files sent from the log queue to the analyzer excluding a log file determined by the computing system to be invalid, wherein the analytics on the collection of log files from the log queue comprise a determination of operational characteristics of computing resources, and the analyzer is separated by the network from the blockchain system and the computing system.

12. The article of claim 11, wherein the instructions to access the block comprise instructions executable by the computing system to retrieve, from the distributed ledger, the block corresponding to a block signature of the block.

13. The article of claim 12, wherein the block signature of the block is retrieved from a repository in the computing resource.

14. The article of claim 11, wherein the information identifying the computing resource in the block comprises a unique identifier of the computing resource.

15. The article of claim 11, wherein the determination of the operational characteristics of the computing resources comprises detecting a malicious pattern or a fault in a system.

16. The article of claim 11, wherein the instructions are executable by the computing system to:
retrieve, at the computing system from a further block of the distributed ledger, third information comprising information identifying a further computing resource and at least one of a signature of metadata of a further log file or a signature of data content of the further log file;
retrieve, at the computing system from the further log file in the log queue, fourth information comprising information identifying the further computing resource and at least one of a signature of metadata of the further log file in the log queue or a signature of data content of the further log file in the log queue;
determine, at the computing system, whether the third information matches the fourth information; and
remove the further log file from the log queue responsive to the third information not matching the fourth information, to prevent sending the further log file from the log queue to the analyzer.

17. A computing system comprising:
at least one processing resource; and
at least one non-transitory machine readable storage medium comprising instructions executable by the at least one processing resource to:
access, in a distributed ledger of a blockchain system, a block that corresponds to a log file generated for a transaction of a computing resource;
retrieve, from the block, first information comprising a signature including a hash of metadata of the log file, a signature including a hash of data content of the log file, and information identifying the computing resource;
retrieve, from the log file in a log queue, second information comprising a signature including a hash of metadata of the log file in the log queue, a signature including a hash of data content of the log file in the log queue, and information identifying the computing resource;
determine, at the computing system, whether the first information matches the second information; and
validate, at the computing system, the log file in the log queue responsive to determining that the first information matches the second information; and
based on the validating of the log file in the log queue, send, from the computing system, the log file as part of a collection of log files from the log queue over a network to an analyzer to perform analytics by the analyzer on the collection of log files sent from the log queue, the collection of log files sent from the log queue to the analyzer excluding a log file determined by the computing system to be invalid, wherein the analytics on the collection of log files from the log queue comprise a determination of operational characteristics of computing resources, and the analyzer is separated by the network from the blockchain system and the computing system.

18. The computing system of claim 17, wherein the instructions are executable by the at least one processing resource to validate an integrity of the computing resource responsive to determining that the first information matches the second information.

19. The computing system of claim 17, wherein the determination of the operational characteristics of the computing resources comprises detecting a malicious pattern or a fault in a system.

20. The computing system of claim 17, wherein the instructions are executable by the at least one processing resource to:
retrieve, at the computing system from a further block of the distributed ledger, third information comprising information identifying a further computing resource and at least one of a signature of metadata of a further log file or a signature of data content of the further log file;
retrieve, at the computing system from the further log file in the log queue, fourth information comprising information identifying the further computing resource and at least one of a signature of metadata of the further log file in the log queue or a signature of data content of the further log file in the log queue;
determine, at the computing system, whether the third information matches the fourth information; and
remove the further log file from the log queue responsive to the third information not matching the fourth information, to prevent sending the further log file from the log queue to the analyzer.

* * * * *